United States Patent
Brasseur et al.

(10) Patent No.: US 6,731,423 B1
(45) Date of Patent: May 4, 2004

(54) OPTICAL AMPLIFIER AND METHOD

(75) Inventors: Jason Kenneth Brasseur, Colorado Springs, CO (US); David Kurt Neumann, Colorado Springs, CO (US)

(73) Assignee: Neumann Information Systems Inc, Colorado Springs, CO (US)

( * ) Notice: Subject to any disclaimer, the term of this patent is extended or adjusted under 35 U.S.C. 154(b) by 0 days.

(21) Appl. No.: 09/930,336

(22) Filed: Aug. 15, 2001

(51) Int. Cl.⁷ .............................................. H01S 3/108
(52) U.S. Cl. .............................. 359/334; 372/3; 372/6; 372/94
(58) Field of Search ..................... 372/3, 6, 94; 359/334

(56) References Cited

U.S. PATENT DOCUMENTS

| | | | |
|---|---|---|---|
| 3,793,541 A | * 2/1974 | Ashkin et al. ................... 372/3 |
| 3,842,367 A | * 10/1974 | Schlossberg .................. 372/32 |
| 3,879,130 A | * 4/1975 | Greenstein ................... 356/472 |
| 3,995,934 A | * 12/1976 | Nath .......................... 385/125 |
| 4,389,617 A | * 6/1983 | Kurnit ......................... 359/334 |
| 4,523,315 A | * 6/1985 | Stone .......................... 372/3 |
| H15 H | * 1/1986 | Chraplyvy ..................... 372/3 |
| 4,633,103 A | 12/1986 | Hyman et al. ............... 307/426 |
| 4,685,107 A | * 8/1987 | Kafka et al. .................... 372/6 |
| 4,699,452 A | * 10/1987 | Mollenauer et al. ........ 359/160 |
| 4,720,160 A | * 1/1988 | Hicks, Jr. ....................... 385/31 |
| 4,780,876 A | * 10/1988 | Smith et al. ..................... 372/3 |
| 4,833,681 A | * 5/1989 | Akiyama et al. .............. 372/32 |
| 5,072,135 A | * 12/1991 | Huignard et al. ............. 359/327 |
| 5,293,395 A | * 3/1994 | Fournier et al. ................ 372/3 |
| 5,513,194 A | * 4/1996 | Tamura et al. .................. 372/6 |
| 5,521,703 A | * 5/1996 | Mitchell ....................... 356/301 |
| 5,574,589 A | * 11/1996 | Feuer et al. ................... 359/160 |
| 5,880,877 A | 3/1999 | Fermann et al. ............. 359/341 |
| 5,956,355 A | * 9/1999 | Swanson et al. ............... 372/20 |
| 6,052,219 A | 4/2000 | Kidorf et al. ................. 359/334 |
| 6,052,393 A | 4/2000 | Islam ............................. 372/6 |
| 6,081,366 A | 6/2000 | Kidorf et al. ................. 359/341 |
| 6,122,298 A | 9/2000 | Kerfoot, III et al. ............ 372/6 |
| 6,151,337 A | 11/2000 | Carlsten et al. ................ 372/3 |
| 6,151,340 A | * 11/2000 | Rivers .......................... 372/32 |
| 6,163,554 A | 12/2000 | Chang et al. ................... 372/6 |
| 6,163,636 A | 12/2000 | Stentz et al. .................. 385/24 |
| 6,191,877 B1 | 2/2001 | Chraplyvy et al. ......... 359/124 |
| 6,200,309 B1 | 3/2001 | Rice et al. ..................... 606/10 |
| 6,374,006 B1 | * 4/2002 | Islam et al. .................... 385/15 |

OTHER PUBLICATIONS

Arie et al. Opt. Letts. vol. 17, No. 17, Sep. 1, 1992.*
Aoki. J of Light. Tech. vol. 6, No. 7, Jul. 1988.*
Tetu J of Light. Tech. vol. 7, No. 10, Oct. 1989.*
Zhu et al. Opto–Elec and Switching. Nov. 13, 1997.*
Han et al. IEEE Phot. Tech. Letts.*
Chang et al. Leos 2000. vol. 2. Nov. 13, 2000–Nov. 16, 2000.*
Black. LIGO. 2000.*
"Frequency stable $I_2$ Raman laser excited by a cw Frequency doubled monolithic Nd: YAG laser", M. Klug et al, Optics Communications 184, 215–223 (2000).

(List continued on next page.)

*Primary Examiner*—Thomas G. Black
*Assistant Examiner*—Stephen Cunningham
(74) *Attorney, Agent, or Firm*—Law of Office of Dale B. Halling LLC (57) ABSTRACT

A broad bandwidth optical amplifier (50) includes an optical pump source (52). A Raman chamber (56) is coupled to an output (54) of the optical pump source (52). An optical fiber ring (62) having a first end (64) is coupled to a first end (66) of the Raman chamber (56). A second end (60) of the optical fiber is coupled to a second end (58) of the Raman chamber (56). A doped optical fiber is coupled to a second end of the optical fiber ring. The Raman chamber produces a number resonant Raman stokes lines.

39 Claims, 7 Drawing Sheets

OTHER PUBLICATIONS

"Enhanced operation of a CW optically pumped molecular iodine cell laser operating in the visible and near–infrared spectrum", Jones, O'Shaughnessy, and Lainé, Optics Communications 131, 203–210, (1996).

Optical gain on the I2 ($B_3II_0+->X^{3\Sigma}g$) system produced by a visible wavelength diode laser, Davis, Holtzclaw, Journal of Applied Physics, vol. 88 No. 2, Jul. 15, 2000, pp. 621–625.

"Three–level molecular iodine laser pumped by a cw dye laser", Matyugin and Ustinov, Sov. J. Quantum Electron, vol. 9, No. 10, Oct. 1979 pp. 1278–1283.

Continuous Wave Optically Pumped Iodine Laser Spectroscopy and Long Range Analysis of the $X_1\Sigma_g$ Ground State of $I_2$, Koffend, Bacis, and Field, Journal of Molecular Spectroscopy 77, 202–212(1979).

"Optically Pumped Continuous $I_2$ Molecular Laser", Wellegehausen, Friede and Welling, Optics Communications, vol. 23, No. 2, Nov. 1977, pp. 157–161.

"Pulsed $I_2$ pumped by a tunable laser", Ustinov, Shulenin, and Alekseev, Sov. J. Quantum Electon, vol.15 No. 8, Aug. 1985, pp. 1086–1092.

"Molecular Iodine Laser Optically Pumped at 521 nm and 531 nm,", Barwood and Marx, Optics Communications, vol. 41, No. 3, Apr. 1, 1982, pp. 195–198.

"Optically Pumped CW Dimer Lasers", Wellegehausen, IEEE Journal of Quantum Electronics, vol. QE, No. 10, Oct. 1979, p. 1108–1130.

"Optically Pumped Molecular Iodine Vapor–Phase Laser", Byer, Herbst, Kildal, and Leneson, Appl. Phys. Lett, vol. 20, No. 11, Jun. 1, 1972, pp. 463–466.

"Spectroscopic and kinetic studies of a dye laser pumped $Br_2$ $B^3II(0_u)->X^1\Sigma_g$ laser)", Perram and Davis, J. Chem. Phys. vol. 84, No. (5), Mar. 1, 1986, pp. 2526–2533.

"An Optically pumped molecular laser", Wodarczyk and Schlosser, J. Chem. Phys. vol. 67, No. 10, Nov. 15, 1977, pp. 4476–4482.

"Quasi–Tunable 12–Laser for Absorption Measurement in the Near Infrared", Hartman and Steinwall, Optics Communications, vol. 21, No. 1, April 1977, pp. 33–38.

"Stability Transfer of Stabilized Ar $^+$ Laser on Optically Pumped $I_2$ Laser Towards a Frequency Standard Around 1.3 $\mu$m", Belaïde Millerioux, Razet, and Juncar, IEEE Transaction on Instrumentation and Measurement, vol. 44, No. 2, Apr. 1995, pp. 461–463.

\* cited by examiner

OPTICAL AMPLIFIER AND METHOD

FIELD OF THE INVENTION

The present invention relates generally to the field of optical amplifiers and lasers and more particularly to a broad bandwidth optical amplifier and method.

BACKGROUND OF THE INVENTION

Figure 1:
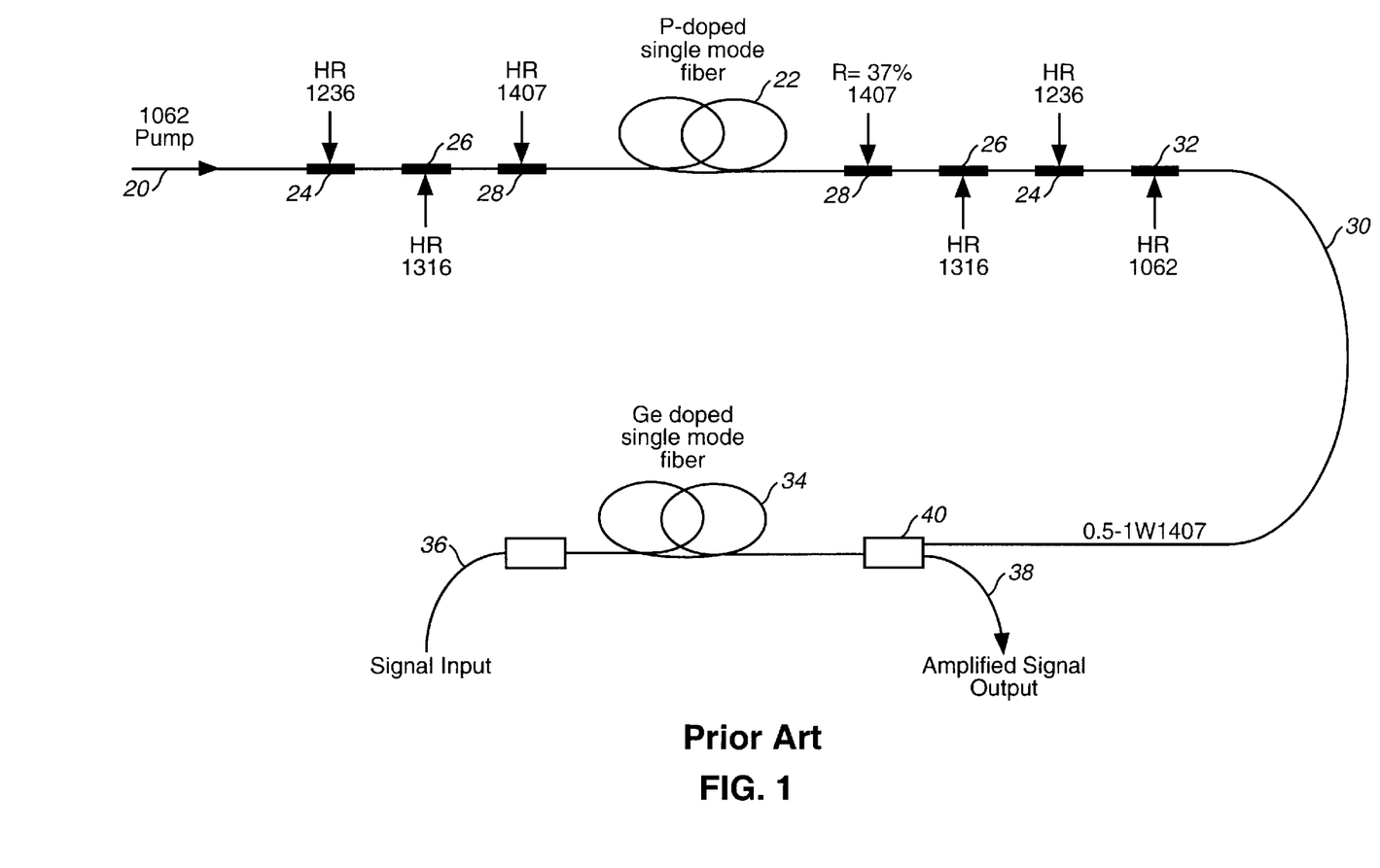
FIG. 1 is a schematic diagram of a prior art optical amplifier.

Fiber optics has promised to carry extraordinary amounts of bandwidth. For long haul systems (over 20 miles) the optical signal requires amplification. Until recently this required converting the optical signal to an electrical signal, amplifying the signal and converting it back to an electrical signal. As a result amplification was expensive and limited to the bandwidth of the optical signal. The advent of erbium doped fiber amplifiers (EDFAs) provided an all optical amplifier. The optical signal is directly amplified without conversion to an electrical signal. Unfortunately, EDFAs tend to only amplify a rather narrow range (narrow bandwidth) of optical wavelengths. As a result, other optical amplifiers have been proposed. One of the most promising solutions to the limited bandwidth (wavelength range) is shown in FIG. 1. A pump light, source 20 at a wavelength of 1062 nm is used to pump a P-doped (Phosphorus doped) single mode fiber 22. A plurality of highly reflective (HR) mirrors pairs 24, 26, 28 are strategically spaced about the P-doped single mode fiber 22. Note that the first mirror pair (Bragg gratings) is highly reflective at 1236 nm. The second mirror pair is highly reflective at 1316 nm and the third mirror pair is highly reflective at 1407 nm. As a result the output light 30 has amplified light around 1236 nm, 1316 nm and 1407 nm. A final mirror 32 is highly reflective, at 1062 nm or the pump wavelength. Generally the mirrors 24, 26, 28, 32 are highly reflective near the specified wavelength and are highly transmissive at other wavelengths.

The output light 30 is coupled into a germanium doped single mode fiber 34. The output light 30 acts as a pump for the germanium doped fiber 34. The input communication signal 36 enters the germanium-doped fiber 34 and is amplified. The amplified signal 38 exits through a splitter 40 or other device. While this device is a significant improvement over the EDFAs, amplification of a larger wavelength range is already foreseeable. For instance, the prior art device of FIG. 1 cannot amplify signals in the 700–1000 nm range, which is an important band of wavelengths since it is a highly transmissive part of optical fibers. In addition the prior art systems cannot amplify signals in the gaps between the Stokes amplified lines.

Thus there exist a need for an optical amplifier that can cover a wide range of optical wavelengths in a continuous fashion.

DETAILED DESCRIPTION OF THE DRAWINGS

A broad bandwidth optical amplifier includes an optical pump source. A Raman chamber is coupled to an output of the optical pump source. An optical fiber ring having a first end is coupled to a first end of the Raman chamber. A second end of the optical fiber is coupled to a second end of the Raman chamber. A doped optical fiber is coupled to a second end of the optical fiber ring. The Raman chamber produces a number of Stokes resonant lines between 550 nm to 2350 nm. The optical fiber ring increases the output power by eliminating spatial modes in the Raman chamber. An embodiment of the amplifier was shown to produce 86% photon conversion of the pump laser source. The Stokes resonant lines are broadened by other devices. The optical amplifier has an extremely broad range of wavelengths that can be amplified with high levels of photon conversion.

Figure 2:
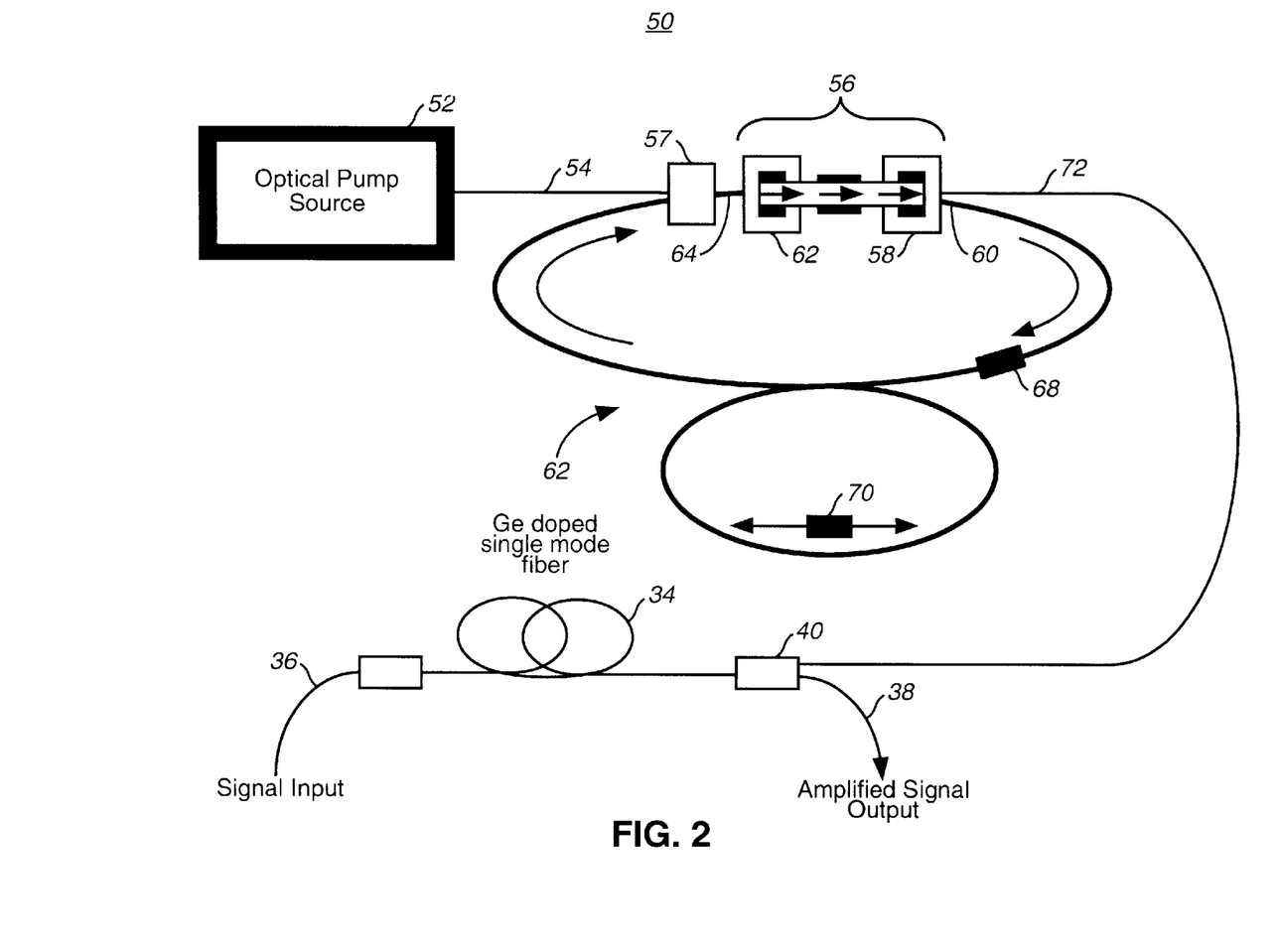
FIG. 2 is a schematic diagram of a Raman ring laser that is part of an optical amplifier in accordance with one embodiment of the invention.
Figure 6:
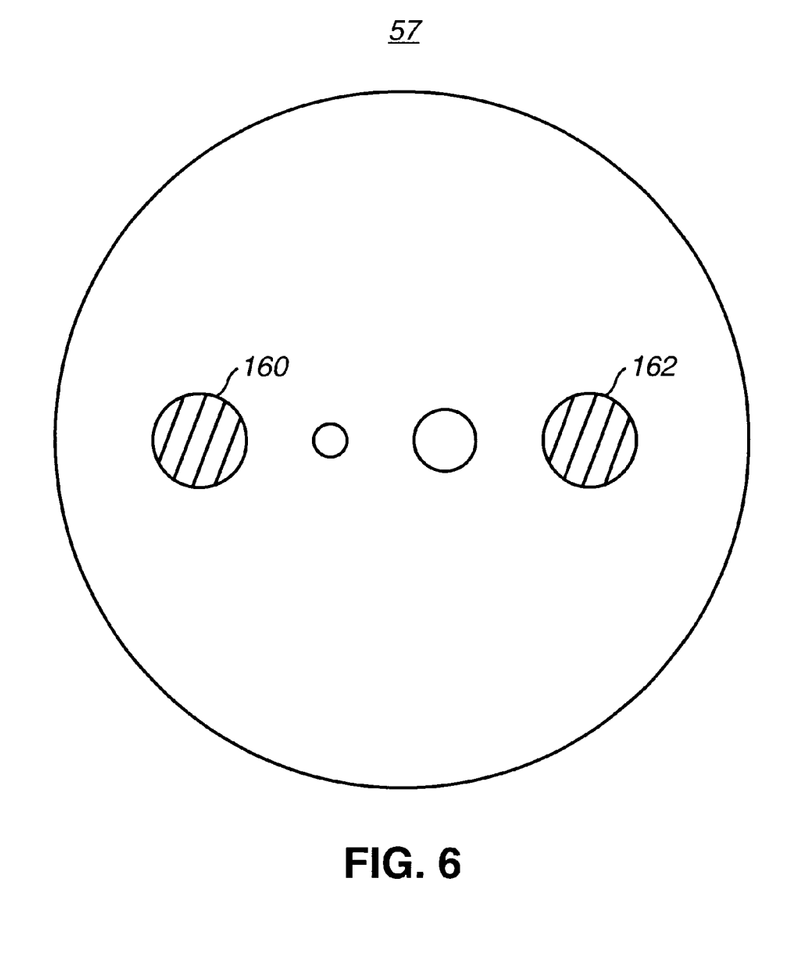
FIG. 6 is a cross sectional view of a "panda" style single mode polarization maintaining fiber in accordance with one embodiment of the invention.

FIG. 2 is a schematic diagram of a Raman ring laser 50 that is part of an optical amplifier in accordance with one embodiment of the invention. The Raman ring laser 50 has an optical pump source (pump laser source) 52 connected to a single mode fiber 54. The optical pump source may be ND:YAG laser that is frequency doubled or a YB doped fiber laser that is frequency doubled or direct diode pumped. In one embodiment the optical pump source is a frequency tuned and locked laser. The output 54 of the optical pump source 52 is coupled into a Raman chamber (Raman active component) 56 by a two-core specialty fiber (first coupler system) 57. In one embodiment, the optical pump source is mode locked to the Raman chamber. The optical pump source provides an output resonant with an absorbing species in the Raman chamber. A cross section of an example of the specialty fiber is shown in FIG. 6. The Raman chamber 56 has a first end (second coupler system) 58 coupled to a first end (first port) 60 of an optical fiber ring 62. A second end 64 of the optical fiber ring 62 is coupled to a second end 66 of the Raman chamber 56. In one embodiment, the fiber of the fiber ring 62 is a polarization maintaining single mode fiber. The fiber ring 62 includes a frequency selective device 68. In one embodiment the frequency selective device is a Bragg grating or an etalon or a birefringent filter. The frequency selective device is used for fine-tuning the wavelengths of the light traversing the optical fiber ring 62. Generally the tuning is done by attenuating high gain lines so that specific lower gain lines can lase. A course tuning device is a piezoelectric transducer 70 that is attached; to a portion of the optical fiber ring and stretches the optical fiber 62. The stretching changes the center frequency of the lasing by changing the cavity length. The output 72 of the Raman ring laser 50 is coupled to a doped optical fiber, as shown in FIG. 1. Note that the doped optical fiber may be doped with germanium, terbium, $P_2O_5$, deuterium or hydrogen.

Figure 3:
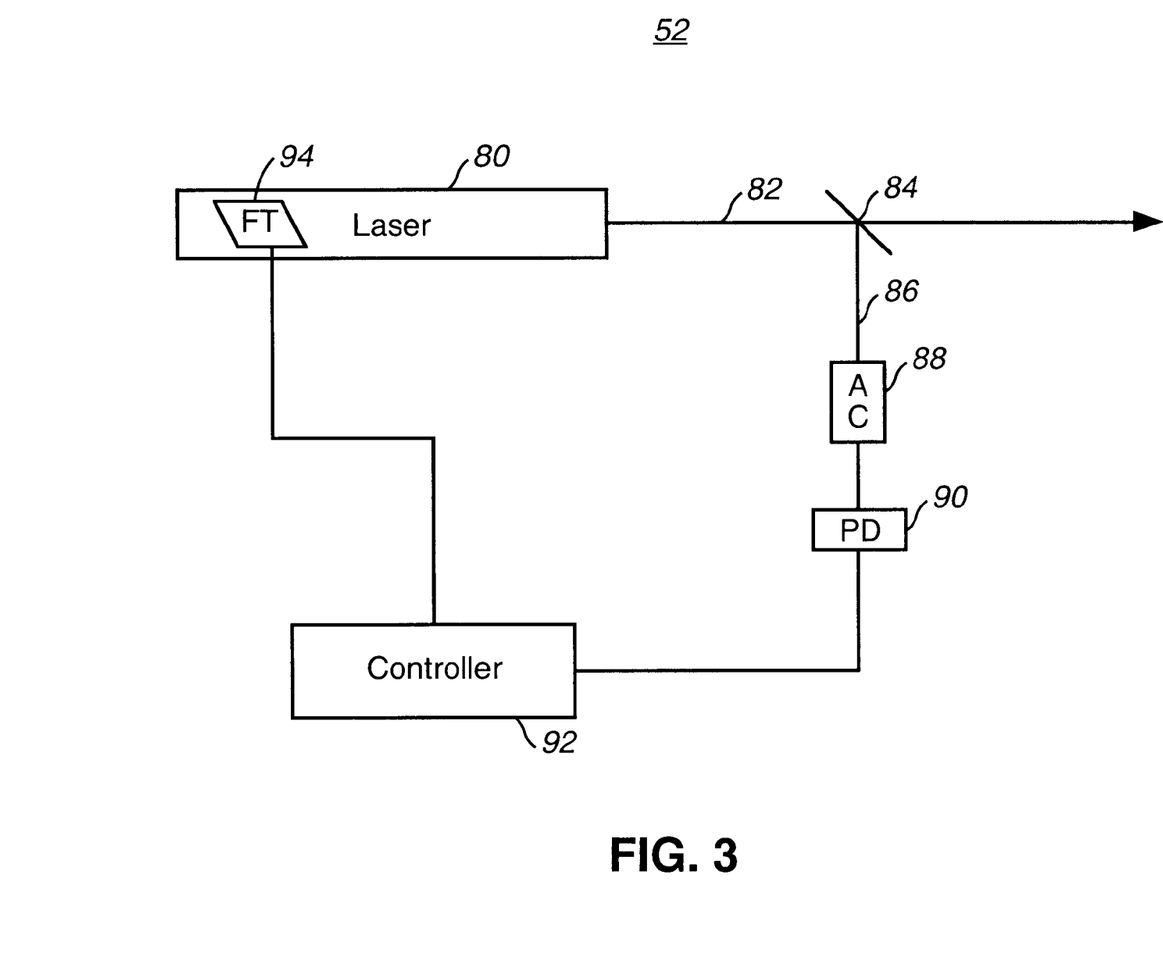
FIG. 3 is a schematic diagram of a pump laser system having a frequency tuning a locking system in accordance with one embodiment of the invention.

FIG. 3 is a schematic diagram of a pump laser system 52 having a frequency tuning and locking system in accordance with one embodiment of the invention. A laser 80 has an output 82 that is split by a mirror (splitter) 84. A portion 86 of the output light is coupled into an absorption cell (AC) 88. The absorption cell (frequency locking absorption cell system) 88 contains the same Raman active material as the Raman chamber. A photodetector (detector) 90 detects the output from the absorption cell 88. The photodetector 90 is connected to a controller 92. The controller 92 is also connected to a frequency-tuning device (FT) 94 of the laser 80. The controller 92 causes the laser to scan through its tuning range and determines when a maximum fluorescence or minimum transmission of pump light occurs in the absorption cell. The maximum fluorescence occurs when the laser's output is tuned for the maximum absorption by the Raman chamber. In one embodiment the frequency-tuning device (tuning servo system) is a mirror that is movable by a small motor. In another embodiment, the frequency-tuning device is a birefringent material. Diode lasers can be frequency tuned by changing the temperature of the diode(s) or by modulating the current driving the diode. In one embodiment, the frequency tunable laser should have a tuning range from 10–20 GHz.

Figure 4:
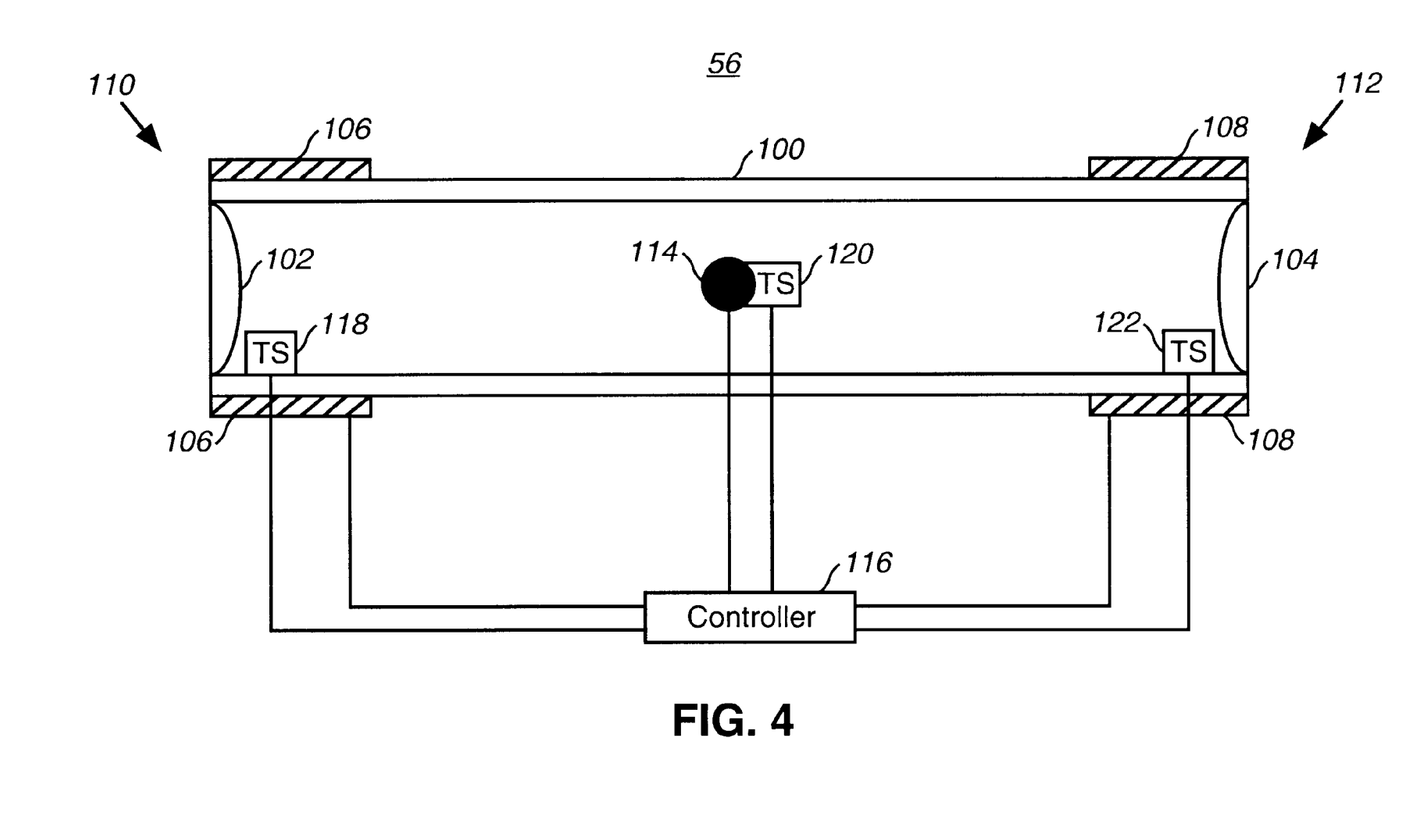
FIG. 4 is a schematic diagram of a Raman chamber in accordance with one embodiment of the invention.

FIG. 4 is a schematic diagram of a Raman chamber 56 in accordance with one embodiment of the invention. The Raman chamber is a hollow core optical fiber 100 containing a Raman active gas. The Raman active gas may be a halogen gas or an inter-halogen gas. Presently iodine gas is one of the common choices for the Raman gas. The Raman gas is placed in the chamber at a predetermined pressure. Generally, a lower pressure in the range of 0.1 to 1.0 Torr is used for iodine gas. A pair of lens 102, 104 are used to seal the hollow core optical fiber 100. In one embodiment the lens are anti-reflection coated lens. In one embodiment the lens 102, 104 are replaced with Brewster's windows. In another embodiment an end of the Raman chamber 56 is sealed with a single mode fiber. A pair of heating elements 106, 108 is place at the ends 110, 112 of the hollow core fiber 100. A thermo-electric cooler 114 is placed on the center of the hollow core fiber 100. The heaters (pair of heating elements) 106, 108 and the cooler 114 are controlled by a controller 116. The, heaters can be resistive element heaters. A plurality of temperature sensors 118, 120, 122 are placed at the ends and in the middle of the hollow core fiber 100. The temperature sensors may be thermistors that have a resistance that correlates to the temperature. The controller 116 maintains a several degree difference between the center temperature and the temperature of the ends of the chamber. The ends are kept warmer to avoid any condensation on the windows 102, 104 and the center is kept cooler to control the density of the gas throughout the cell.

In one embodiment the Raman chamber is a doped fiber. The fiber is doped with the same materials as the Raman chamber, generally by placing the fiber in a chamber under very high pressures of the Raman gas. The doped fiber does not require the heaters and coolers.

Figure 5A:
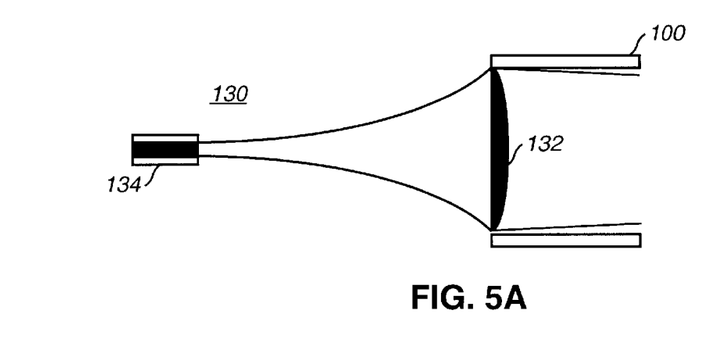
FIGS. 5A–C are examples of devices for coupling a Raman chamber to an optical fiber in accordance with one embodiment of the invention.
Figure 5B:
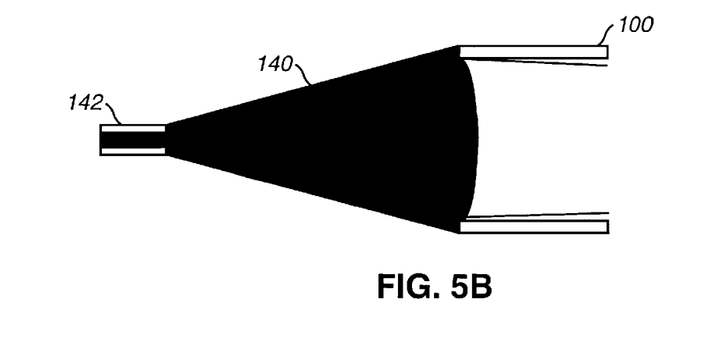
Figure 5C:
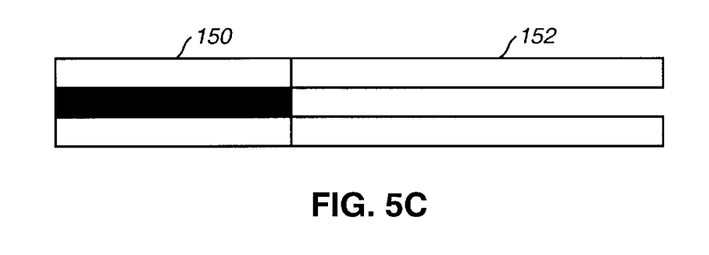

FIGS. 5A–C are examples of devices for coupling a Raman chamber to an optical fiber in accordance with one embodiment of the invention. FIG. 5A is a free space coupler with the lens 132 on an end of the Raman chamber focused into the single mode fiber 134. FIG. 5B is a lens 140, such as a gradient index lens, fused to the single mode fiber 142 and the hollow core fiber 100. FIG. 5C is an example of a single mode fiber 150 fused to a specially designed single mode hollow core fiber 152.

FIG. 6 is a cross sectional view of a "panda" style single mode polarization maintaining fiber 57 in accordance with one. embodiment of the invention. The single mode specialty fiber 57 has two single mode cores 160, 162 spaced about 5 μm–15 μm apart. The close spacing allows for efficient overlap and/or coupling of the pump Raman laser modes in the hollow core fiber. For example, coupling to a 100 μm hollow core fiber with a 10 μm separation, approximately 90% of the pump light can be coupled to the hollow core fiber. Similarly, two stripped single mode fibers can be used to replace the dual core fiber, or a splitter may be used to combine both the pump and Raman light into one fiber. In the event of direct coupling of the solid core fiber to the hollow core fiber gain medium, the pump laser needs to propagate through the same core as the fiber ring Raman laser, or be coupled through the side of the hollow core fiber. Good overlap between the pump laser light and the Raman light is important in keeping the photon conversion rates high.

Figure 7:
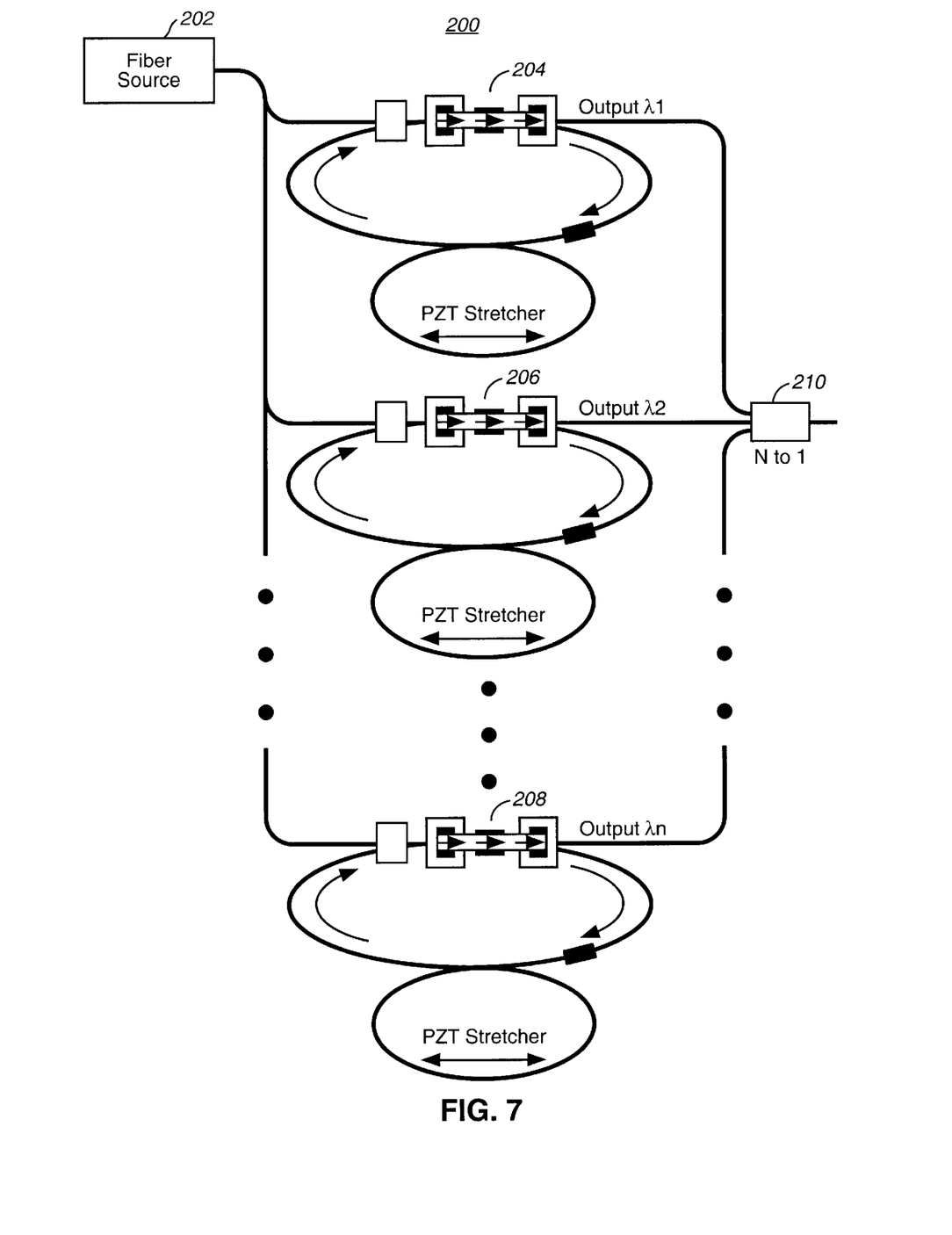
FIG. 7 is a schematic diagram of a system having a plurality of optical amplifiers in accordance with one embodiment of the invention.

FIG. 7 is a schematic diagram of a system 200 having a plurality of optical amplifiers in accordance with one embodiment of the invention. The system 200 has a single optical pump source 202 that pumps a plurality of Raman ring lasers 204, 206, 208. Each Raman ring laser is operated at a different wavelength. The outputs may be combined 210 to provide a very broad-spectrum amplifier.

A method of amplifying an optical signal includes the steps of pumping the Raman active component with a light from a tunable pump laser source. The tunable pump laser source is tuned to provide an Optimal absorption of light by the Raman active component. The output of the Raman active component is coupled into a doped optical fiber. An optical signal to be amplified is coupled through the doped optical fiber. In one embodiment the Raman active component is incorporated into an optical fiber ring. In another embodiment an end of the Raman active component is heated and a center of the Raman active component is cooled. A controller maintains a predetermined temperature difference between the end and the center of the Raman active component.

The step of tuning the pump laser source includes diverting a portion of the light from the tunable pump laser to an absorption cell. An output from the absorption cell is measured. The wavelength of the tunable pump laser is tuned to find an optimal output from the absorption cell.

Thus there has been described a broad bandwidth optical amplifier that can cover wavelengths from 550 nm to 2350 nm. In addition, the Raman ring laser that is the heart of the amplifier has a photon conversion rate of over 80%. This optical amplifier allows fiber optic systems to greatly expand the wavelengths that can be used to transmit information.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A broad bandwidth optical amplifier, comprising:

an optical pump source;

a Raman chamber is coupled to an output of the optical pump source producing multiple Stokes resonant lines;

an optical fiber ring having a first end coupled to a first end of the Raman chamber and a second end coupled to a second end of the Raman chamber, the optical fiber ring eliminates spatial modes in the Raman chamber;

a doped optical fiber having a first end and a second end, the first end coupled to a second end of the optical fiber ring;

an input coupled to the second end of the doped optical fiber ring for receiving a signal to be amplified; and a splitter coupled to the second end of the doped optical fiber ring forming an output for the amplified signal.

2. The amplifier of claim 1, wherein the optical pump source is a frequency tuned and locked laser.

3. The amplifier of claim 1, wherein the optical pump source provides an output resonant with an absorbing species in the Raman chamber.

4. The amplifier of claim 1, wherein the optical pump source includes a frequency locking absorption cell system.

5. The amplifier of claim 1, further including a polarization maintaining single mode fiber connected to the optical pump source, the optical fiber ring and the Raman chamber.

6. The amplifier of claim 1, further including a pair of stripped single mode fibers, one of the pair of stripped single mode fibers connected to the optical pump source, a second of the pair of the stripped single mode fibers connected the optical fiber ring and an output of the pair of stripped single mode fibers connected to the Raman chamber.

7. The amplifier of claim 1, further including a splitter connected to the optical pump source, the optical fiber ring and the Raman chamber.

8. The amplifier of claim 1, wherein the Raman chamber is a hollow core fiber filled with a Raman active gas.

9. The amplifier of claim 8, wherein the Raman chamber further includes a Brewster's window at a first end of the hollow core fiber.

10. The amplifier of claim 8, wherein the Raman chamber further includes an anti-reflection coated lens at a first end of the hollow core fiber.

11. The amplifier of claim 8, wherein the Raman chamber is sealed at the first end by a single mode optical fiber.

12. The amplifier of claim 8, further including a system for heating a pair of ends of the Raman chamber.

13. The amplifier of claim 8, wherein the Raman active gas is a halogen gas.

14. The amplifier of claim 8, wherein the Raman active gas is an inter-halogen gas.

15. The amplifier of claim 8, wherein the Raman active gas is below a pressure of 1 atmosphere.

16. The amplifier of claim 1, further including:
 a coupler connected to the optical fiber ring and the optical pump source;
 a section of a single mode optical fiber having a first end connected to an output of the coupler;
 a free space lens coupled to a second end of the single mode optical fiber and adjacent to the Raman chamber.

17. The amplifier of claim 1, further including:
 a coupler connected to the optical fiber ring and the optical pump source;
 a section of a single mode optical fiber having a first end connected to an output of the coupler;
 a gradient index lens attached to a second end of the single mode optical fiber and adjacent to the Raman chamber.

18. The amplifier of claim 1, further including:
 a coupler connected to the optical fiber ring and the optical pump source;
 a section of a single mode optical fiber having a first end connected to an output of the coupler and a second end fused to the Raman chamber.

19. The amplifier of claim 1, wherein the optical fiber ring includes a frequency selective device.

20. The amplifier of claim 19, wherein the frequency selective device is a Bragg grating.

21. The amplifier of claim 19, wherein the frequency selective device is an etalon.

22. The amplifier of claim 19, wherein the frequency selective device is a birefringent filter.

23. The amplifier of claim 1, further including a piezoelectric transducer attached to a portion of the optical fiber ring.

24. The amplifier of claim 1, wherein the doped optical fiber is doped with germanium.

25. A Raman ring laser, comprising:
 a pump laser source;
 a first coupler system having a first port connected to the pump laser source providing multiple stokes resonant lines;
 a Raman active component having a first end connected to a second port of the first coupler system, the Raman active component comprising,
  a hollow core fiber containing a Raman active gas,
  a pair of heating elements, one of the pair of heating elements at a first end of the hollow core fiber and a second of the pair of heating elements at a second end of the hollow core fiber,
  a thermo-electric cooler near a center of the hollow core fiber,
  a controller connected to the pair of heating elements and the thermo-electric cooler;
 a second coupler system having a first port connected to a second end of the Raman active component and a second port forming an output of the Raman ring laser, the Raman ring laser having a continuous output; and
 an optical fiber ring having a first end connected to a third port of the first coupler system and a second end connected to a third port of the second coupler system.

26. The laser of claim 25, wherein the pump laser source is a tunable laser having a tunable range of at least 10 GHz.

27. The laser of claim 26, wherein the pump laser source includes a frequency tuning and locking system.

28. The laser of claim 27, wherein the automated frequency tuning and locking system includes an absorption cell, a detector that detects an output of the absorption cell and a tuning servo system receiving an output from the detector.

29. The laser of claim 25, wherein the output of the Raman ring laser has a spectral range from 550 nm to 2300 nm.

30. The laser of claim 25, wherein the Raman active component is an optical fiber doped with an element selected from the classes of halogen elements and inter-halogen elements.

31. The laser of claim 25, wherein the Raman active gas is at a predetermined pressure.

32. The laser of claim 25, wherein the optical fiber ring includes a wavelength selective device.

33. The laser of claim 25, further including a piezoelectric transducer coupled to the optical fiber ring.

34. A method of amplifying an optical signal comprising the steps of:
 a) pumping a Raman active component with a light from a tunable pump laser source to form multiple Stokes resonant lines;
 b) tuning the tunable pump laser source to provide an optimal absorption of a light by the Raman active component; and
 c) coupling an output of the Raman active component into a doped optical fiber.

35. The method of claim 34, wherein step (a) further includes the step of:
 a1) incorporating the Raman active component into an optical fiber ring.

36. The method of claim 34, further including the step of:
 d) coupling an optical signal through the doped optical fiber.

37. The method of claim 34, wherein step (a) further includes the steps of:

a1) heating an end of the Raman active component;

a2) cooling a center of the Raman active component.

38. The method of claim 37, further including the step of:

a3) maintaining a predetermined temperature difference between the end of the Raman active component and the center of the Raman active component.

39. The method of claim 34, wherein step (b) further includes the step of:

b1) diverting a portion of the light from the tunable pump laser to an absorption cell;

b2) measuring an output from the absorption cell;

b3) varying an output wavelength of the tunable pump laser to find an optimal output from the absorption cell.

* * * * *